United States Patent
Chu

(10) Patent No.: US 7,493,096 B2
(45) Date of Patent: Feb. 17, 2009

(54) APPARATUS AND METHOD FOR PROCESSING DIGITAL MULTIMEDIA BROADCAST (DMB) SIGNALS

(75) Inventor: Sung Ho Chu, Seoul (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 11/283,830

(22) Filed: Nov. 22, 2005

(65) Prior Publication Data
US 2006/0148432 A1    Jul. 6, 2006

(30) Foreign Application Priority Data
Nov. 22, 2004   (KR) .................. 10-2004-0095834

(51) Int. Cl.
*H04B 1/06*   (2006.01)
*H04Q 7/20*   (2006.01)

(52) U.S. Cl. .................. 455/277.2; 455/552.1

(58) Field of Classification Search .............. 455/277.1, 455/277.2, 552.1, 553.1; 375/267, 347
See application file for complete search history.

(56) References Cited

U.S. PATENT DOCUMENTS
7,212,798 B1 * 5/2007 Adams et al. ............ 455/251.1

2005/0079849 A1 * 4/2005 Na et al. ................. 455/323

FOREIGN PATENT DOCUMENTS

| CN | 1248827 A | 3/2000 |
|---|---|---|
| JP | 08-149059 | 6/1996 |
| JP | 08-264233 | 10/1996 |
| JP | 11-150496 | 6/1999 |
| JP | 2002-158603 | 5/2002 |

* cited by examiner

*Primary Examiner*—Lee Nguyen
(74) *Attorney, Agent, or Firm*—McKenna Long & Aldridge LLP

(57) ABSTRACT

An apparatus and method for processing DMB signals in a DMB receiver such as a mobile communication terminal are disclosed to simplify the DMB receiver. The apparatus for processing DMB signals received via at least two antennas includes: an antenna switching unit for selecting one of at least two signals received via the two antennas; a DMB path unit for pre-processing the selected signal; and a DMB chipset unit for detecting a signal level of the pre-processed signal, and controlling the antenna switching unit, wherein the DMB chipset unit controls the antenna switching unit to select the other one of the two signals according to the signal level detected by the DMB chipset unit.

6 Claims, 5 Drawing Sheets

APPARATUS AND METHOD FOR PROCESSING DIGITAL MULTIMEDIA BROADCAST (DMB) SIGNALS

This application claims the benefit of Korean Patent Application No. 10-2004-0095834, filed on Nov. 22, 2004, which is hereby incorporated by reference as if fully set forth herein.

BACKGROUND OF THE INVENTION

1. Field of the Invention

The present invention relates to a digital multimedia broadcast (DMB) service, and more particularly, to an apparatus and method for processing DMB signals in a DMB receiver such as a mobile communication terminal.

2. Discussion of the Related Art

Generally, as high-quality digital audio devices such as a Compact Disc (CD) or a Digital Versatile Disc (DVD) have rapidly come into widespread use throughout the world, demands of listeners who listen to digital broadcast data requiring high-quality audio data (i.e., high-quality sound) have also rapidly increased. Therefore, in order to obviate a limitation in improving the quality of audio data for use in a typical Frequency Modulation (FM) broadcast service, a Digital Audio Broadcasting (DAB) system has been widely used in many countries, for example, the United States, Europe, and Canada, etc.

The DAB system provides a user with high-quality audio data using a technology different from those of typical Amplitude Modulation (AM) or FM broadcast systems, and has superior reception ability while in motion using the same technology, and can transmit digital data such as video or audio data at high speed. In recent times, a variety of multimedia services including both audio data and video data have been generally called a Digital Multimedia Broadcasting (DMB) service.

FIG. 1 is a block diagram illustrating a conventional DMB signal processor for use in a Code Division Multiple Access (CDMA) mobile communication terminal.

The above-mentioned conventional DMB signal processor for use in the CDMA mobile communication terminal will hereinafter be described with reference to FIG. 1.

Referring to FIG. 1, a CDMA signal including DMB signals is received in a DMB_CDMA antenna 10a, and is then applied to a diplexer 20a.

The received signal is divided into a CDMA signal and DMB signal(s) at the diplexer 20a. The CDMA signal is applied to a CDMA Radio Frequency (RF) path 50, such that it is used for CDMA communication. The DMB signal is applied to a Personal Multimedia Satellite Broadcasting (PMSB) diversity path 60a.

Generally, the above-mentioned PMSB diversity path 60a includes a Low Noise Amplifier (LNA) 61a, a Surface Acoustic Wave (SAW) filter 63a, and a DMB TV tuner 65a, etc., such that it performs pre-processing of the above-mentioned DMB signal so as to allow the pre-processed DMB signal to be suitable for an input signal of a DMB chipset unit 90.

In the meantime, another DMB signal is received in the DMB antenna 10b, and is then applied to the diplexer 20b. The DMB signal delayed by the diplexer 20b is applied to the PMSB main path 60b.

Generally, the PMSB main path 60b includes a LNA 61b, a SAW filter 63b, and a DMB TV tuner 65b in the same manner as in the above-mentioned PMSB diversity path 60a, and performs pre-processing of the above-mentioned DMB signal, such that the pre-processed DMB signal to be suitable for an input signal of the DMB chipset unit 90.

As described above, the first DMB signal via the PMSB diversity path 60a and the second DMB signal via the PMSB main path 60b are applied to the DMB chipset unit 90. The DMB chipset unit 90 compares the first DMB signal with the second DMB signal, selects one DMB signal having a superior reception signal level from among the first and second DMB signals, and performs signal-processing of the selected DMB signal to implement the DMB service.

Constituent components of the PMSB diversity path 60a or the PMSB main path 60b, for example, the LNA 61a or 61b, the SAW filter 63a or 63b, and the DMB TV tuner 65a or 65b, etc., are high-priced components. Under the above-mentioned situation, if a DMB signal for use in one path is selected by the DMB chipset unit, the high-priced LNA, SAW filter, and DMB TV tuners for use in the other path are not used. Unused circuitry results in an unnecessary draw on power as well as an increase in production costs.

SUMMARY OF THE INVENTION

Accordingly, the present invention is directed to an apparatus and method for processing digital multimedia broadcast (DMB) signals that substantially obviate one or more problems due to limitations and disadvantages of the related art.

An object of the present invention is to provide an apparatus and method for processing DMB signals in a DMB receiver such as a mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for processing digital multimedia broadcast (DMB) signals received via at least two antennas comprises: an antenna switching unit for selecting one of at least two signals received via the two antennas; a DMB path unit for pre-processing the selected signal; and a DMB chipset unit for detecting a signal level of the pre-processed signal, and controlling the antenna switching unit, wherein the DMB chipset unit controls the antenna switching unit to select the other one of the two signals according to the signal level detected by the DMB chipset unit.

In another aspect of the present invention, there is provided a method for processing digital multimedia broadcast (DMB) signals received via at least two antennas comprising the steps of: a) receiving at least two DMB signals via the two antennas, respectively; b) selecting one of the two DMB signals; c) pre-processing the selected DMB signal; d) detecting a signal level of the pre-processed DMB signal; and e) determining if it is necessary to select the other one of the two DMB signals according to the detected signal level.

In yet another aspect of the present invention, there is provided an apparatus for processing digital multimedia broadcast (DMB) signals received via two antennas comprising: a phase-shifting unit for phase-shifting one of two DMB signals received via the two antennas to output a first phase-shifted signal, wherein the other one of the two DMB signals is a first non-phase-shifted signal; an antenna switching unit for alternately switching the first phase-shifted signal and the first non-phase-shifted signal, to output a mixed signal; a DMB path unit for pre-processing the mixed signal; a port switching unit for alternately switching the pre-processed signal in a synchronous way with the antenna switching unit, to divide the pre-processed signal into a second phase-shifted signal and a second non-phase shifted signal; a phase-recovery unit for restoring the second phase-shifted signal to a third non-phase-shifted signal; and a DMB chipset unit for comparing a signal level of the second non-phase-shifted signal with that of the third non-phase-shifted signal, and simultaneously controlling the antenna switching unit and the port switching unit, wherein one of the two DMB signals received via the two antennas is stationarily selected to be received in the DMB chipset unit via the DMB path unit according to the result of the comparison of the DMB chipset unit, until a signal level of the stationarily-selected DMB signal is less than a predetermined reference level.

In yet another aspect of the present invention, there is provided a method for processing digital multimedia broadcast (DMB) signals received via two antennas comprising the steps of: a) receiving two DMB signals via the two antennas; b) phase-shifting one of the two DMB signals received via the two antennas to output a first phase-shifted signal, wherein the other one of the two DMB signal is a first non-phase-shifted signal; c) forming a mixed signal using the first phase-shifted signal and the first non-phase-shifted signal; d) pre-processing the mixed signal; e) dividing the pre-processed signal into a second phase-shifted signal and a second non-phase shifted signal; f) restoring the second phase-shifted signal to a third non-phase-shifted signal; g) comparing a signal level of the second non-phase-shifted signal with that of the third non-phase-shifted signal; and h) selecting one of the two DMB signals received via the two antennas according to the result of the comparison to implement a DMB service, until a signal level of the selected DMB signal is less than a predetermined reference level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

First Exemplary Embodiment

Figure 1:
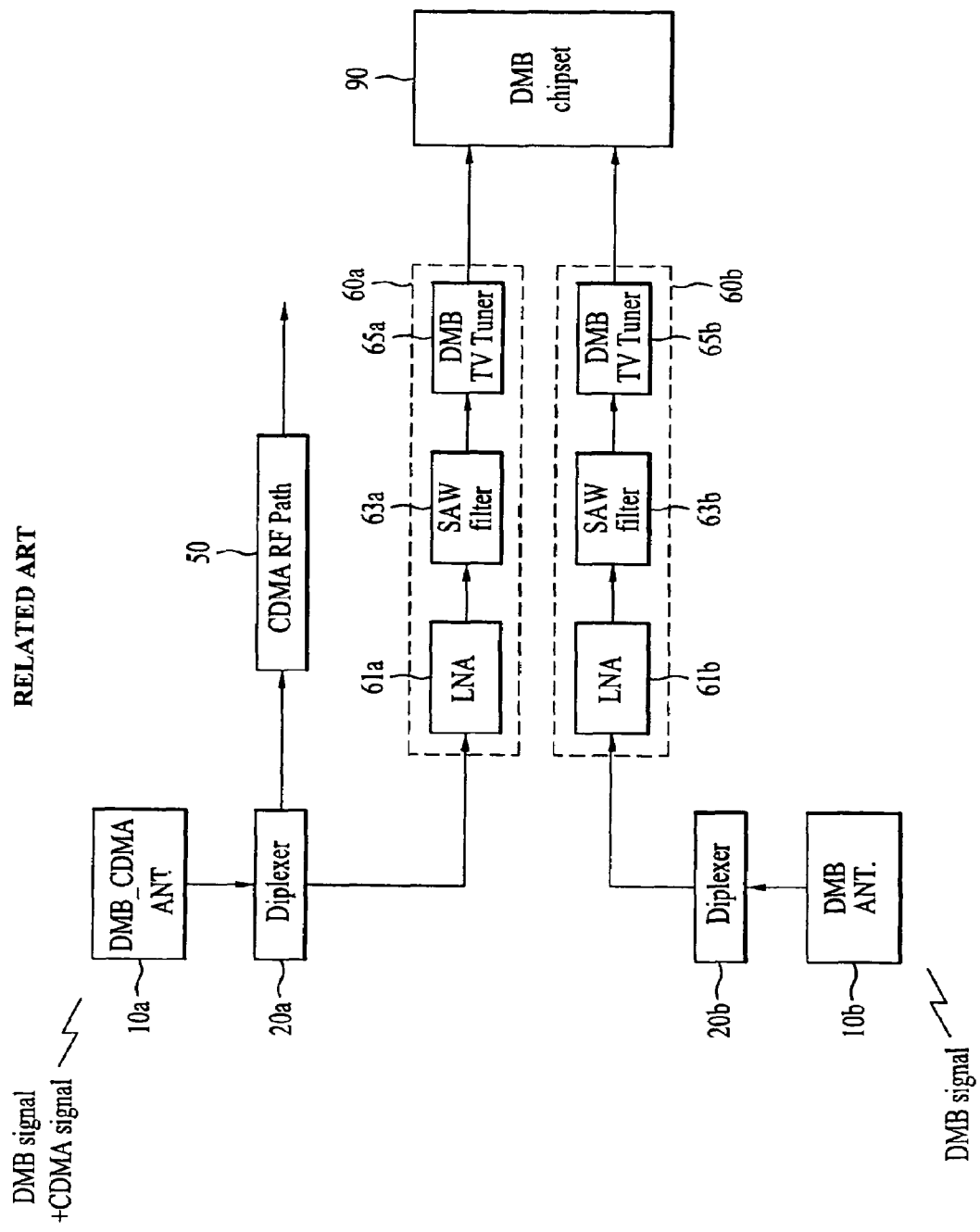
FIG. 1 is a block diagram illustrating a conventional DMB signal processor for use in a Code Division Multiple Access (CDMA) mobile communication terminal.
Figure 2:
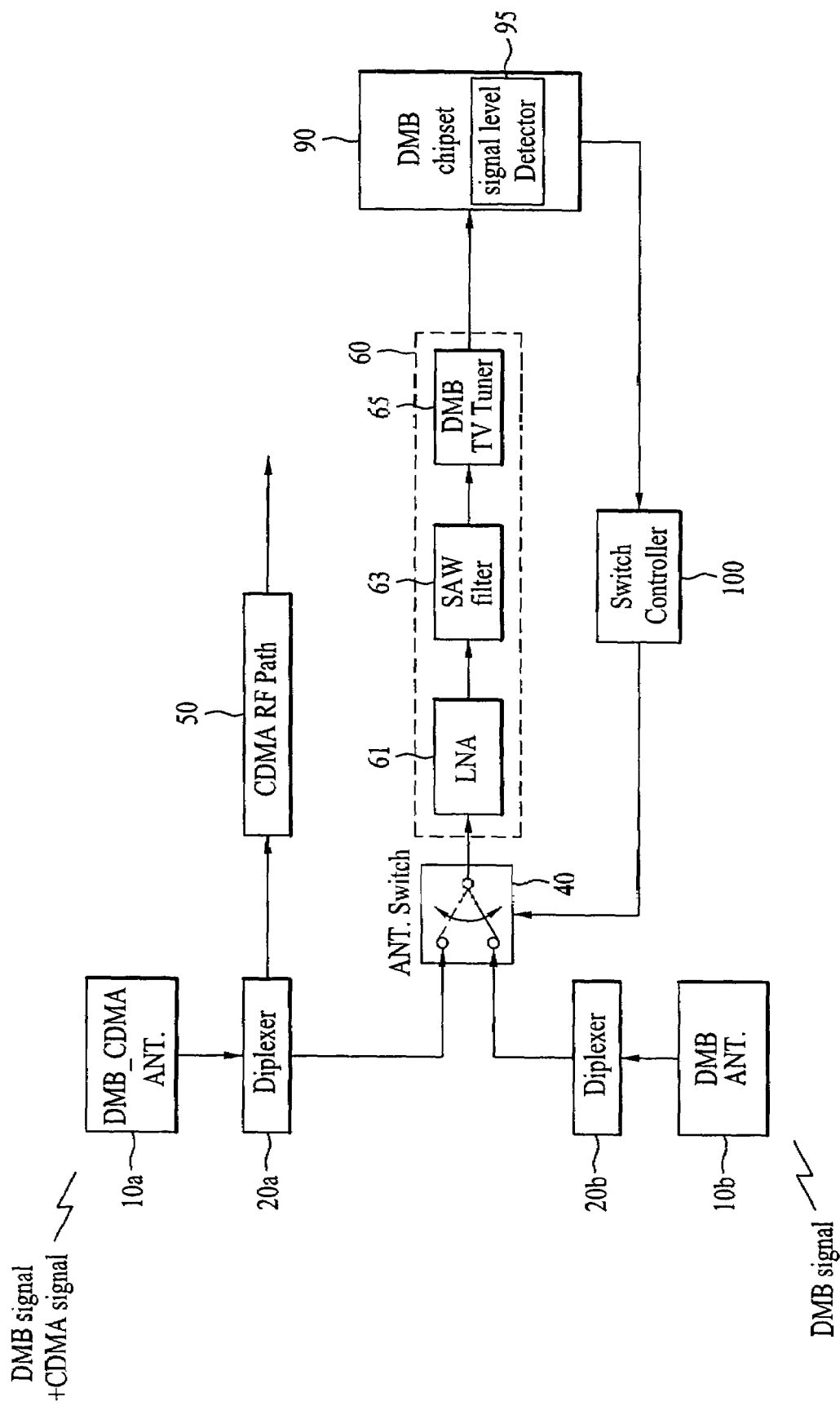
FIG. 2 is a block diagram illustrating a DMB signal processor in accordance with a first exemplary embodiment of the present invention.
Figure 3:
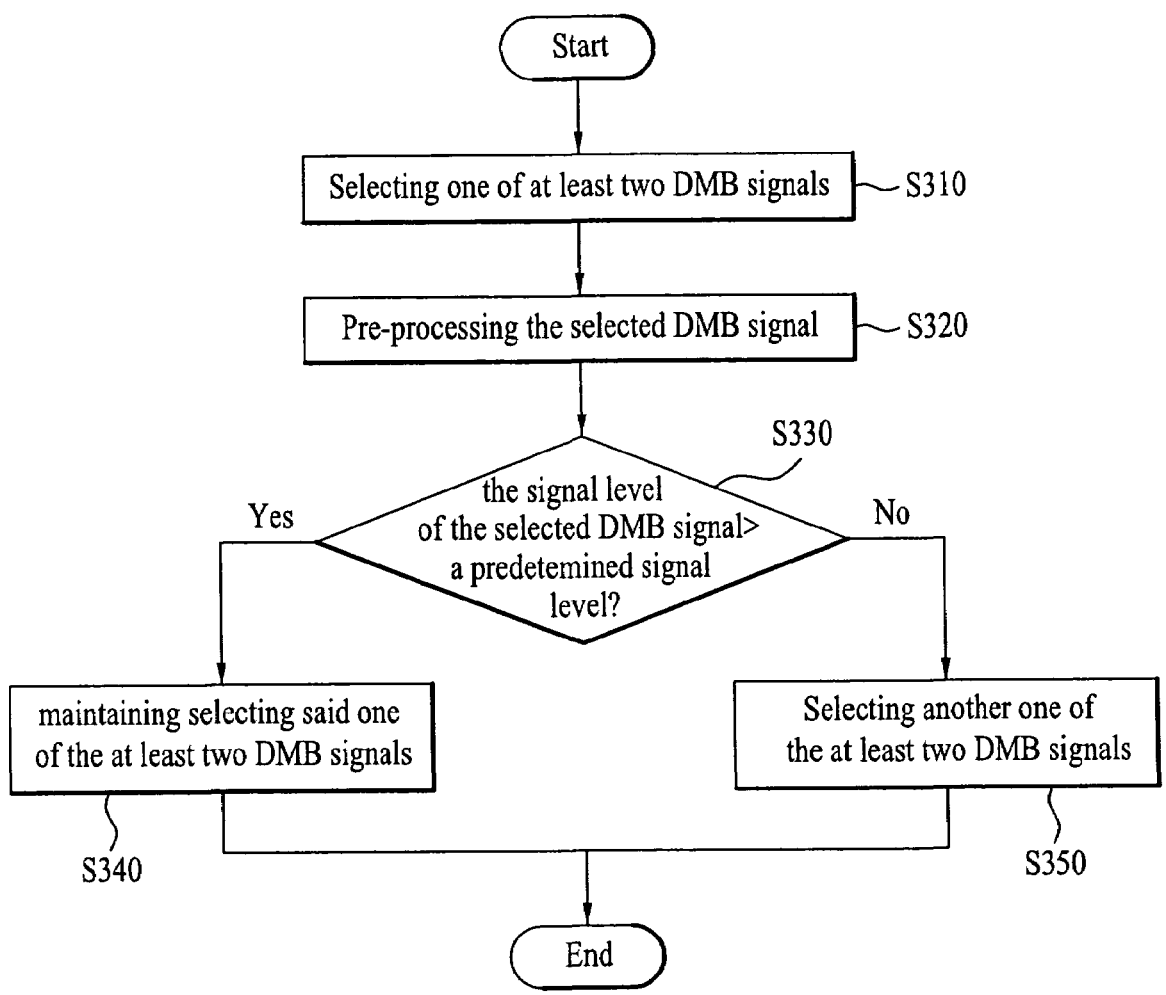
FIG. 3 is a flow chart illustrating a method for processing DMB signal(s) in accordance with a first exemplary embodiment of the present invention.

FIG. 2 is a block diagram illustrating a DMB signal processor in accordance with a first exemplary embodiment of the present invention. FIG. 3 is a flow chart illustrating a method for processing DMB signal(s) in accordance with a first exemplary embodiment of the present invention.

An apparatus and method for processing DMB signal(s) according to the first exemplary embodiment of the present invention will hereinafter be described with reference to FIGS. 2 and 3.

Referring to FIG. 2, the apparatus for processing DMB signal(s) (hereinafter referred to as a DMB signal processor) according to the first exemplary embodiment controls the DMB_CDMA antenna 10a to receive a CDMA signal including DMB signal (s), and the received CDMA signal is applied to a diplexer 20a.

The received CDMA signal is divided into a CDMA signal and DMB signal at the diplexer 20a. The CDMA signal applied to the CDMA RF path 50, and the DMB signal is received in the antenna switch 40.

In the meantime, another DMB signal is received in the DMB antenna 10b, and is then applied to the diplexer 20b. In this case, the diplexer 20b is not used for signal distribution, and is adapted to delay the DMB signal received in the DMB antenna 10b by a predetermined period of time during which the other DMB signal received in the DMB_CDMA antenna 10a is delayed by the other diplexer 20a.

The DMB signal delayed by the diplexer 20b is applied to the antenna switch 40.

The antenna switch 40 selects one of two DMB signals applied to the antenna switch 40 upon receiving a control signal from a switch controller 100, and a detailed description thereof will be described later.

The DMB signal selected by the antenna switch 40 is applied to the PMSB path 60. The PMSB path 60 may include the LNA 61, the SAW filter 63, and the DMB TV tuner 65, etc. The DMB signal selected by the antenna switch 40 is pre-processed by the PMSB path 60, such that the pre-processed DMB signal is suitable for an input signal of the DMB chipset unit 90.

The DMB signal pre-processed by the PMSB path 60 is applied to the DMB chipset unit 90. The DMB chipset unit 90 provides a DMB service using the above-mentioned DMB signal. The signal-level detector 95 contained in the DMB chipset unit 90 detects a signal level of the DMB signal received in the DMB chipset unit 90, and compares the detected signal level with a predetermined reference signal level.

In this case, if the signal level of the pre-processed DMB signal is higher than the predetermined reference signal level, the DMB chipset unit 90 continuously employs the selected DMB signal to implement the DMB service. Otherwise, if the signal level of the pre-processed DMB signal is equal to or less than the predetermined reference signal level, the DMB chipset unit 90 allows the switch controller 100 to control the antenna switch 40, such that the antenna switch 40 selects the other DMB signal other than the selected DMB signal.

A method for processing DMB signal(s) according to the first exemplary embodiment will hereinafter be described with reference to FIG. 3.

Referring to FIG. 3, the antenna switch selects one of at least two DMB signals received via at least two antennas at step S310.

The selected DMB signal is pre-processed by the PMSB path, such that it can be suitable for an input signal of the DMB chipset unit in the future at step S320.

The pre-processed DMB signal is applied to the DMB chipset unit, and is pre-processed for the DMB service. The signal level of the pre-processed DMB signal is compared with a predetermined reference signal level at step S330.

If the signal level of the pre-processed DMB signal is higher than the predetermined reference signal level, the selected one of at least two DMB signals received in at least two antennas is continuously maintained at step S340. Otherwise, if the signal level of the pre-processed DMB signal is equal to or less than the predetermined reference signal level, the other one of at least two DMB signals received in at least two antennas is selected by the antenna switch at step S350.

Second Exemplary Embodiment

Figure 4:
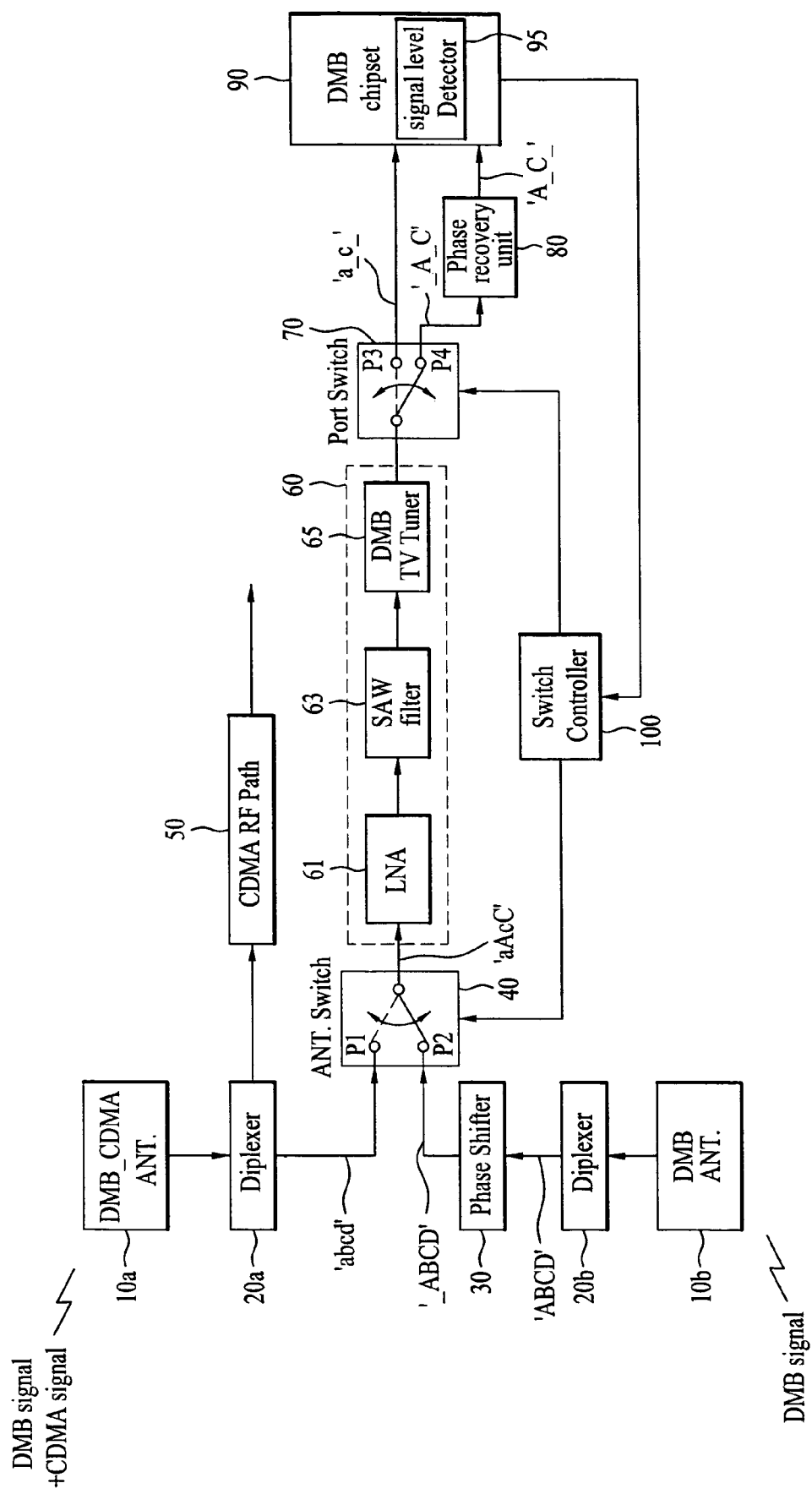
FIG. 4 is a block diagram illustrating a DMB signal processor in accordance with a second exemplary embodiment of the present invention.
Figure 5:
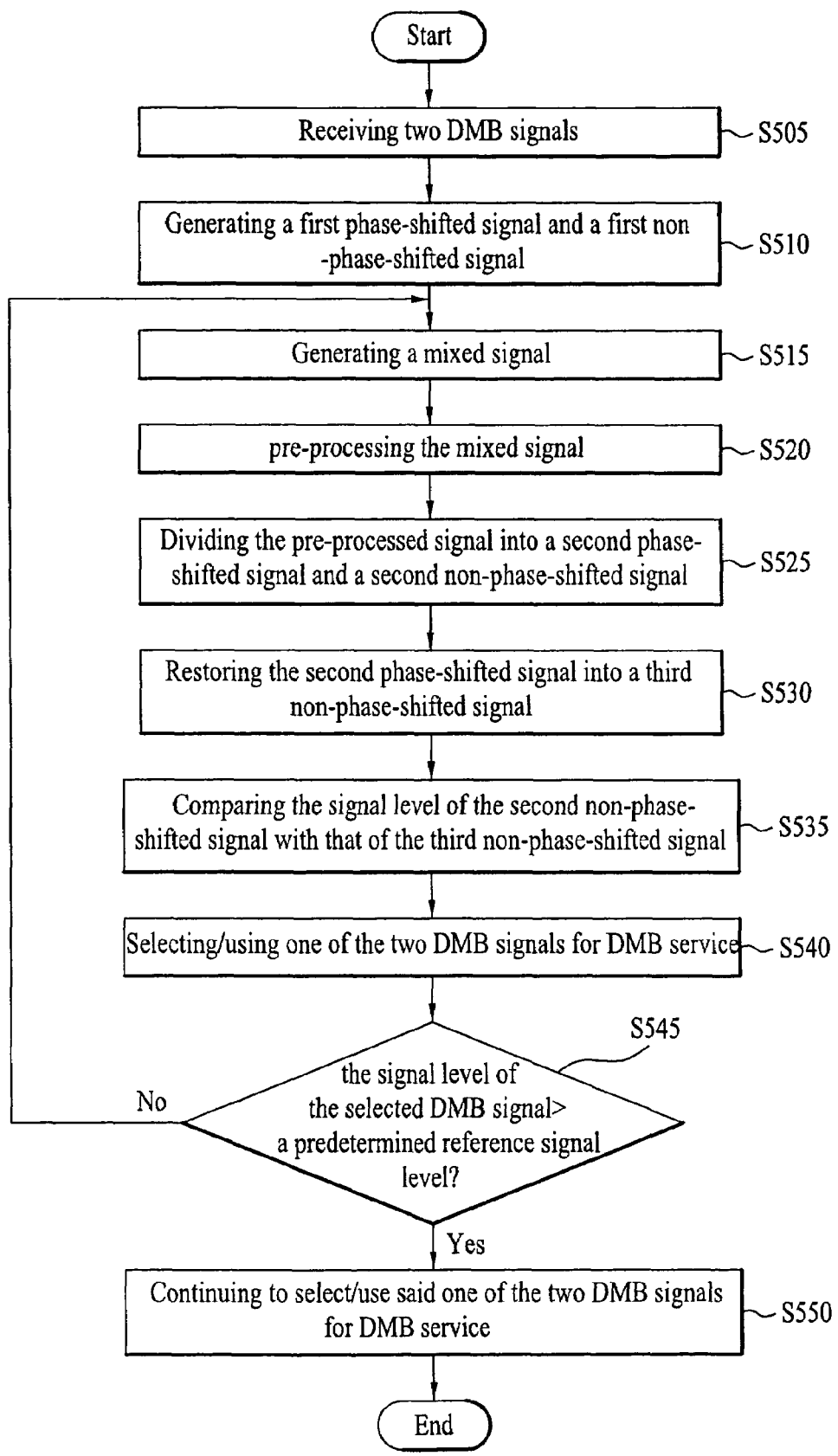
FIG. 5 is a flow chart illustrating a method for processing DMB signal(s) in accordance with a second exemplary embodiment of the present invention.

FIG. 4 is a block diagram illustrating a DMB signal processor in accordance with a second exemplary embodiment of the present invention. FIG. 5 is a flow chart illustrating a method for processing DMB signal(s) in accordance with a second exemplary embodiment of the present invention.

An apparatus and method for processing DMB signal(s) according to the second exemplary embodiment of the present invention will hereinafter be described with reference to FIGS. 4 and 5.

Referring to FIG. 4, the apparatus for processing DMB signal(s) (hereinafter referred to as a DMB signal processor) according to the second exemplary embodiment controls the DMB_CDMA antenna 10a to receive a CDMA signal including DMB signal(s), and the received CDMA signal is applied to a diplexer 20a.

The received CDMA signal is divided into a CDMA signal and DMB signal(s) at the diplexer 20a. The CDMA signal is applied to the CDMA RF path 50, and the DMB signal is received in the antenna switch 40. For the convenience of description, it should be noted that the above-mentioned DMB signal is referred to as an "abcd" in FIG. 4 and associated description.

In the meantime, another DMB signal is received in the DMB antenna 10b, and is then applied to the diplexer 20b. In this case, the diplexer 20b is not used for signal distribution, and is adapted to delay the DMB signal received in the DMB antenna 10b by a predetermined period of time during which the other DMB signal received in the DMB_CDMA antenna 10a is delayed by the other diplexer 20a. For the convenience of description, it should be noted that the above-mentioned DMB signal delayed by the diplexer 20b is referred to as an "ABCD" in FIG. 4.

The above-mentioned "ABCD" signal is applied to a phase shifter 30, and is phase-shifted by the phase shifter 30. It should be noted that the phase-shifted "ABCD" signal is referred to as a "_ABCD" signal in FIG. 4 and associated description.

The "abcd" and "_ABCD" signals are applied to the antenna switch 40. However, the mixed signal cannot allow all data units of the "abcd" signal to be matched with all data units of the "_ABCD" signal due to limited switching speed of the antenna switch 40, such that it cannot configure a pair (e.g., "aAbBcCdD") of the "abcd" signal and the "_ABCD" signal.

Therefore, the antenna switch 40 outputs the mixed signal in which some parts of the "abcd" signal and some parts of the "_ABCD" signal configure a pair of signals. For the convenience of description, it should be noted that the mixed signal generated from the antenna switch 40 is referred to as an "aAcC" in FIG. 4 and associated description.

The "aAcC" signal is applied to the PMSB path 60. The PMSB path 60 may include the LNA 61, the SAW filter 63, and the DMB TV tuner 65, etc. The "aAcC" signal is pre-processed by the PMSB path 60, such that the pre-processed "aAcC" signal is suitable for an input signal of the DMB chipset unit 90.

The pre-processed "aAcC" signal is applied to a port switch 70. The port switch 70 serves as a "1-to-2" port switch including a single input port and two output ports as shown in FIG. 4. Upon receiving a control signal from the switch controller 100, the port switch 70 establishes synchronization with the antenna switch 40, such that it performs an alternating-switching operation at high speed. Therefore, the port switch 70 divides the pre-processed "aAcC" signal into a first signal which is not phase-shifted by the phase shifter 30 and a second signal which is phase-shifted by the phase shifter 30. For the convenience of description, it should be noted that the first signal indicative of a non-phase-shifted signal is referred to as an "a_c_" signal, and the second signal indicative of a phase-shifted signal is referred to as an "_A_C" signal. The above-mentioned "_A_C" signal is applied to a phase recovery unit 80, such that the phase recovery unit 80 recovers a phase of the "_A_C" signal. For the convenience of description, it should be noted that the above-mentioned phase-recovery signal is referred to as an "A_C_" in FIG. 4.

The above-mentioned "a_c_" signal and the above-mentioned "A_C_" signal are applied to the DMB chipset unit 90. The signal-level detector 95 of the DMB chipset unit 90 detects a signal level of the "a_c_" signal and a signal level of the "A_C_" signal, and compares the detected signal level of the "a_c_" signal with the signal level of the "A_C_" signal.

If the signal level of the "a_c_" signal is higher than that of the "A_C_" signal, the DMB chipset unit 90 allows the switch controller 100 to control the antenna switch 40 and the port switch 70, such that the antenna switch 40 and the port switch 70 switch the DMB signal received in the DMB_CDMA antenna 10a so as to allow the DMB chipset unit 90 to receive the aforementioned DMB signal. In other words, the DMB chipset unit 90 allows the switch controller 100 to control the antenna switch 40 and the port switch 70, such that the antenna switch 40 is continuously connected to a contact point P1 of FIG. 4, and the port switch 70 is continuously connected to a contact point P3 of FIG. 4. Therefore, the DMB chipset unit 90 provides a user with a DMB service using the DMB signal received in the DMB_CDMA antenna 10a.

If a signal level of the "A_C_" signal is higher than that of the "a_c_" signal, the DMB chipset unit 90 allows the switch controller 100 to control the antenna switch 40 and the port switch 70, such that the antenna switch 40 and the port switch 70 switch the DMB signal received in the DMB antenna 10b so as to allow the DMB chipset unit 90 to receive the aforementioned DMB signal.

In other words, the DMB chipset unit 90 allows the switch controller 100 to control the antenna switch 40 and the port switch 70, such that the antenna switch 40 is continuously connected to a contact point P2 of FIG. 4, and the port switch 70 is continuously connected to a contact point P4 of FIG. 4. Therefore, the DMB chipset unit 90 provides a user with a DMB service using the DMB signal received in the DMB antenna 10b.

In the meantime, if a signal level of a received DMB signal is less than a predetermined reference signal level while the DMB chipset unit 90 provides the user with the DMB service, the DMB chipset unit 90 allows the switch controller 100 to control the antenna switch 40 and the port switch 70, such that the antenna switch 40 and the port switch 70 performs an alternating-switching operation at high speed.

Thereafter, the DMB chipset unit 90 re-performs the above-mentioned procedure for determining which one of the first DMB signal received via the DMB_CDMA antenna 10a and the second DMB signal received via the DMB antenna 10b is suitable for the DMB service.

FIG. 4 is a block diagram illustrating a DMB signal processor in accordance with a second exemplary embodiment of the present invention. FIG. 5 is a flow chart illustrating a method for processing DMB signal (s) in accordance with a second exemplary embodiment of the present invention.

The method for processing DMB signal(s) according to the second exemplary embodiment will hereinafter be described with reference to FIGS. 4 and 5.

Referring to FIG. 5, a first DMB signal is received in the DMB_CDMA antenna 10a, and a second DMB signal is received in the DMB antenna 10b at step S505.

One of the above-mentioned first and second DMB signals is phase-shifted by the phase shifter 30 at step S510. For the convenience of description, it should be noted that one DMB signal generated from the phase shifter 30 is referred to as a first phase-shifted signal, and the other DMB signal not generated from the phase shifter 30 is referred to as a first non-phase-shifted signal.

Upon receiving the first phase-shifted signal and the first non-phase-shifted signal, the antenna switch 40 forms a mixed signal using the above-mentioned received signals at step S515.

Thereafter, the mixed signal is pre-processed by the PMSB path 60 at step S520.

The port switch 70 divides the pre-processed signal into a second phase-shifted signal and a second non-phase shifted signal at step S525.

Thereafter, the phase recovery unit 80 recovers a phase of the second phase-shifted signal, such that the recovered signal serves as a third non-phase-shifted signal at step S530.

The DMB chipset unit 90 compares a signal level of the second non-phase-shifted signal with that of the third non-phase-shifted signal at step S535.

According to the result of the comparison at step S535, one of the DMB signal received in the DMB_CDMA antenna 10a and the other DMB signal received in the DMB antenna 10b is selected and used for the DMB service at step S540. The above-mentioned selection procedure has already been disclosed as stated above, so that a detailed description thereof will herein be omitted for the convenience of description.

Thereafter, the DMB chipset unit 90 continuously or periodically compares the signal level of the selected DMB signal with a predetermined reference signal level at step S545 while the DMB service is supplied to a user via the selected DMB signal.

If the signal level of the selected DMB signal is higher than the predetermined reference signal level, the DMB chipset unit 90 continuously employs the above-mentioned selected DMB signal to provide the user with the DMB service at step S550. Otherwise, if the signal level of the selected DMB signal is less than the predetermined reference signal level, the DMB chipset unit 90 returns to step S515, such that it re-performs the above-mentioned procedure for determining which one of the first DMB signal received via the DMB_CDMA antenna 10a and the second DMB signal received via the DMB antenna 10b is suitable for the DMB service.

As apparent from the above description, an apparatus and method for processing DMB signals according to the present invention can transmit one DMB signal having at least predetermined signal level from among at least two DMB signals received in two antennas to the DMB chipset unit via a single DMB path, such that a DMB receiver can be more simplified and its production cost can also be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for processing digital multimedia broadcast (DMB) signals received via two antennas comprising:
   a phase-shifting unit for phase-shifting one of two DMB signals received via the two antennas to output a first phase-shifted signal, wherein the other one of the two DMB signals is a first non-phase-shifted signal;
   an antenna switching unit for alternately switching the first phase-shifted signal and the first non-phase-shifted signal, to output a mixed signal;
   a DMB path unit for pre-processing the mixed signal;
   a port switching unit for alternately switching the pre-processed signal in a synchronous way with the antenna switching unit, to divide the pre-processed signal into a second phase-shifted signal and a second non-phase shifted signal;
   a phase-recovery unit for restoring the second phase-shifted signal to a third non-phase-shifted signal; and
   a DMB chipset unit for comparing a signal level of the second non-phase-shifted signal with that of the third non-phase-shifted signal, and simultaneously controlling the antenna switching unit and the port switching unit,
   wherein one of the two DMB signals received via the two antennas is stationarily selected to be received in the DMB chipset unit via the DMB path unit according to the result of the comparison of the DMB chipset unit, until a signal level of the stationarily-selected DMB signal is less than a predetermined reference level.

2. The apparatus as set forth in claim 1, wherein the DMB chipset unit controls both the antenna switching unit and the port switching unit to stationarily perform switching of one of the two DMB signals, such that the one of the two DMB signals received via the two antennas is supplied to the DMB chipset unit via the DMB path unit,
   wherein the one of the two DMB signals corresponds to one of the second non-phase-shifted signal and the third non-phase-shifted signal, which has a signal level higher than that of the other one of the second non-phase-shifted signal and the third non-phase-shifted signal.

3. The apparatus as set forth in claim 2, further comprising:
   a switch controller unit for use in the antenna switching unit and the port switching unit, wherein the DMB chipset unit controls the antenna switching unit and the port switching unit using the switch controller unit.

4. The apparatus as set forth in claim 1, further comprising:
   a switch controller unit for use in the antenna switching unit and the port switching unit, wherein the DMB chipset unit controls the antenna switching unit and the port switching unit using the switch controller unit.

5. A method for processing digital multimedia broadcast (DMB) signals received via two antennas comprising the steps of:
   a) receiving two DMB signals via the two antennas;
   b) phase-shifting one of the two DMB signals received via the two antennas to output a first phase-shifted signal, wherein the other one of the two DMB signal is a first non-phase-shifted signal;
   c) forming a mixed signal using the first phase-shifted signal and the first non phase-shifted signal;

d) pre-processing the mixed signal;
e) dividing the pre-processed signal into a second phase-shifted signal and a second non-phase shifted signal;
f) restoring the second phase-shifted signal to a third non-phase-shifted signal;
g) comparing a signal level of the second non-phase-shifted signal with that of the third non-phase-shifted signal; and
h) selecting one of the two DMB signals received via the two antennas according to the result of the comparison to implement a DMB service, until a signal level of the selected DMB signal is less than a predetermined reference level.

6. The method as set forth in claim 5, wherein the selected DMB signal in the step h) corresponds to one of the second non-phase-shifted signal and the third non-phase-shifted signal, which has a signal level higher than that of the other one of the second non-phase-shifted signal and the third non-phase-shifted signal.

* * * * *